United States Patent [19]

Slater

[11] 3,852,744

[45] Dec. 3, 1974

[54] SINGLE TIME SHARED RECEIVER AND FREQUENCY TRACKER FOR A BEAM-LOBED DOPPLER RADAR SYSTEM

[75] Inventor: Robert Slater, Bardonia, N.Y.

[73] Assignee: The Singer Company, Little Falls, N.J.

[22] Filed: Jan. 5, 1973

[21] Appl. No.: 321,439

[52] U.S. Cl. ................................................ 343/9
[51] Int. Cl. ............................................. G01s 9/46
[58] Field of Search .................................... 343/8, 9

[56] References Cited
UNITED STATES PATENTS

| | | | |
|---|---|---|---|
| 3,134,102 | 5/1964 | Goldfischer | 343/9 |
| 3,139,618 | 6/1964 | Goldfischer | 343/9 |
| 3,371,341 | 2/1968 | Stavis | 343/9 |
| 3,710,386 | 1/1973 | Darboven | 343/9 |

*Primary Examiner*—Malcolm F. Hubler
*Attorney, Agent, or Firm*—T. W. Kennedy

[57] ABSTRACT

A single time shared receiver and frequency tracker for a beam lobed Doppler radar system. The returns from the fore and aft beams, which are radiated simultaneously are separated through a process of mixing and filtering to obtain two signals which when summed will provide the fore signal and when differenced the aft signal. The sum and difference are alternately sampled and provided to the freqency tracker which includes means to separately store each of the four Doppler system frequencies.

9 Claims, 6 Drawing Figures

SINGLE TIME SHARED RECEIVER AND FREQUENCY TRACKER FOR A BEAM-LOBED DOPPLER RADAR SYSTEM

BACKGROUND OF THE INVENTION

This invention relates to Doppler navigation systems in general and more particularly to a single time-shared receiver and frequency tracker for a beam lobed Doppler radar system.

In one type of Doppler navigation system a pair of beams, including a fore and an aft beam are simultaneously transmitted, first to the right and then to the left. On each of the right and left sides, the beams are also lobed between a first and a second position. Lobing is required because 69 the effects on the radar back-scattered energy which occur when flying over water. By lobing and tracking the intersection of the lobed returns, the measured Doppler shifts are an accurate indication of the vehicle's velocity over the ground independent of its radar back-scattering properties. A typical beam lobed Doppler system is described in U.S. Pat. Nos. 3,134,102 and 3,139,618 granted respectively to L. I. Goldfischer and L. I. Goldfischer et al. on May 19 and June 30, 1964 and assigned to the same assignee as the present invention. Since during each transmission, both a fore and an aft beam are being transmitted, means must be provided in the receiver and the frequency tracker to distinguish between these two beams and to track both frequencies developed therefrom. As described in the above referenced patents, this has typically been done by providing an upper and a lower channel in the receiver and frequency tracker. Obviously, this requires the duplication of a great deal of hardware. Thus, it is evident that a system which can handle both frequencies, i.e., the Doppler frequency signal developed by the forward and the Doppler frequency signal developed by the aft beam could result in a significant saving in hardware costs.

SUMMARY OF THE INVENTION

The present invention permits time sharing of a single receiver and frequency tracker for all four beams of the Doppler system. This is accomplished by separating the fore and aft beam returns through a process of mixing and filtering to obtain two signals which when summed will provide the fore signal and when differenced will provide the aft signal. The two signals, i.e. sum and difference, are then alternately sampled and provided to a single frequency tracker which contains a plurality of storage means to store each of the four Doppler frequencies involved.

DETAILED DESCRIPTION OF THE PREFERRED EMBODIMENT

The various components and blocks which make up the preferred embodiment of the present invention are all well-known in the art and are described in the aforementioned patents and references cited therein. The present invention involves a method of arranging these previous known components and circuits to obtain the desired result of a time-shared receiver and frequency tracker. Thus, circuit details will not be described herein.

Figure 1:
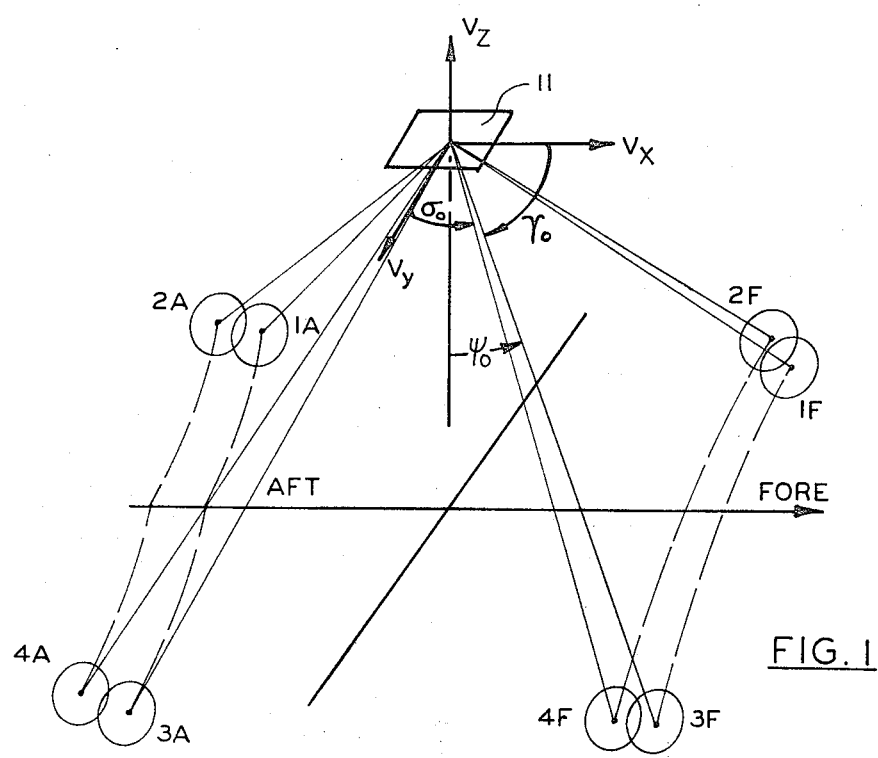
FIG. 1 is a perspective view illustrating the antenna beam radiating geometry.
Figure 2:
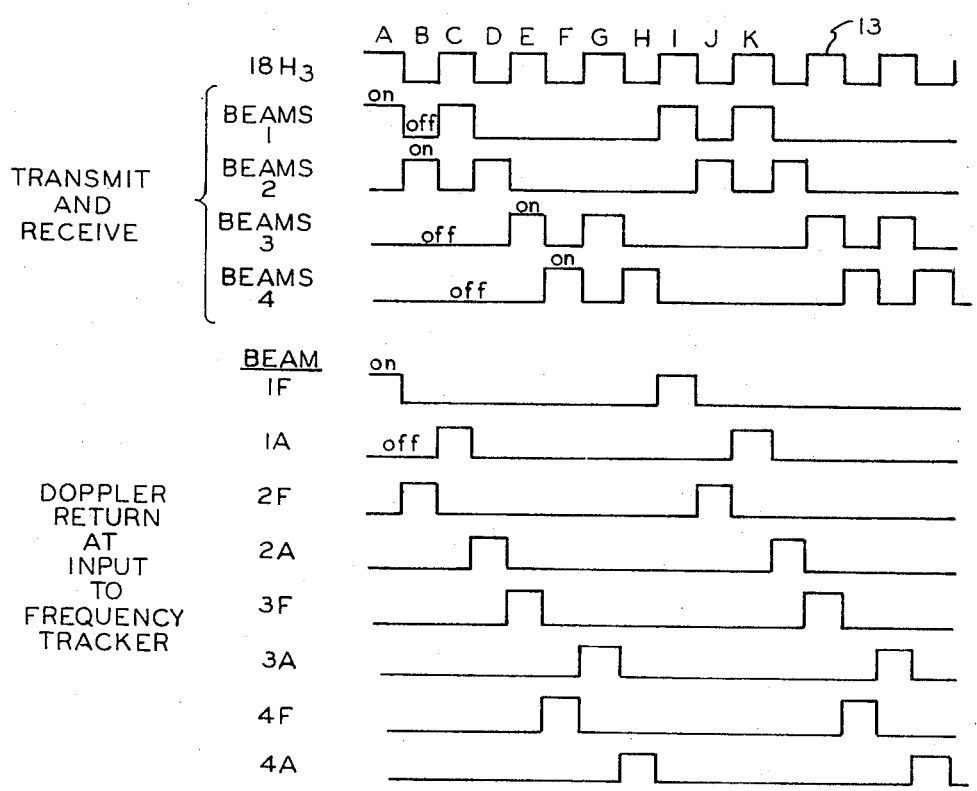
FIG. 2 is a timing diagram illustrating the switching of the beams of FIG. 1.

FIG. 1 illustrates a typical beam pattern generated by a beam lobed doppler system. Antenna 11 is adapted to sequentially transmit and receive four pairs of beams as shown. For example, the antenna will first transmit the beams whose images on the ground are indicated as 1F and 1A. The antenna will then transmit the beams labelled 2F and 2A. The switching between the positions 1 and 2 on the forward and aft beams is what is known as beam lobing. After transmitting and receiving the first and second sets of beams on the lefthand side for a number of cycles, the antenna is switched to transmit and receive the sets of beams 3 and 4 on the righthand side. FIG. 2 illustrates the typical switching waveforms. A basic waveform 13 is generated. During the first four cycles of this waveform, beams 1 and 2 are alternately switched on and off. During the next four cycles of the waveform, beams 3 and 4 are alternately switched on and off. The cycle then repeats. If the waveform 13 is for example 18 hertz, then beam lobing will occur at 18 hertz and right and left switching at the rate of 4.5 hertz. Antenna 11 may be a servoed antenna such as those described in the aforementioned patents or may be a fixed antenna. Details of the antenna construction are given in the above patents.

Figure 3:
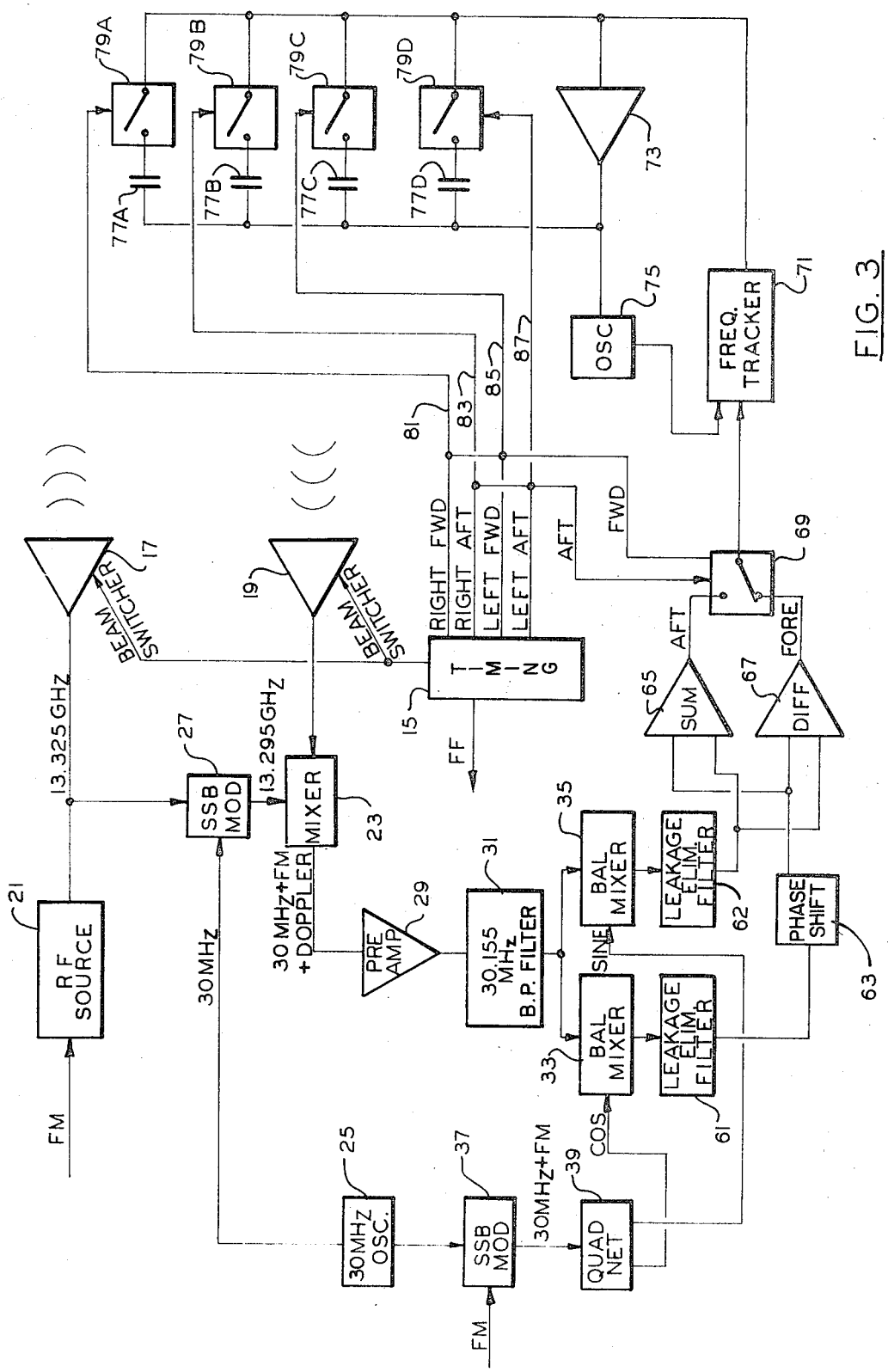
FIG. 3 is a block system diagram of the preferred embodiment of the receiver and tracker of the present invention.

FIG. 3 illustrates an overall block diagram of the system. The timing signals described above are provided in well-known fashion from a timing module 15 to the transmit arrays 17 and receive arrays 19 of the antenna 11. An RF source 21 is frequency modulated by a signal also developed in timer 15 and will provide an RF output at 13.325 GHz, for example, to the transmit array 17. This signal will be transmitted in the manner described above and the return signal received by receiving array 19 and provided to a mixer 23. A 30 MHz signal is developed in an oscillator 25 and is provided along with the 13.325 GHz signal to a single sideband modulator 27. The resulting output of this modulator will be the difference of the two frequencies or 13.295 GHz. This is provided as a second input to mixer 23 resulting in a final output therefrom which will be at 30 MHz plus the FM frequency plus the doppler shift. This signal is then preamplified in a preamplifier 29 and passed through a 30.155 MHz bandpass filter 31 from which it is provided to a balance mixer 33 and a balance mixer 35. The 30.155 MHz bandpass filter, 31, selects the first FM sideband and rejects all higher order sidebands.

Figure 4A:
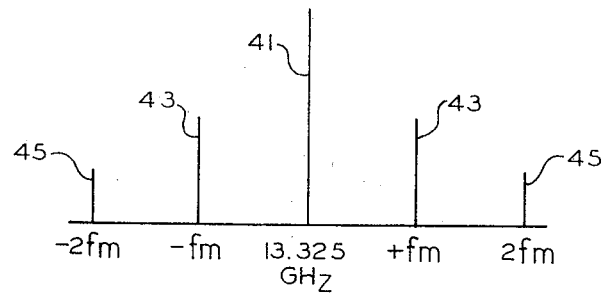
FIG. 4 is a diagram illustrating the nature of the signal at various points in the system of FIG. 3.
Figure 4B:
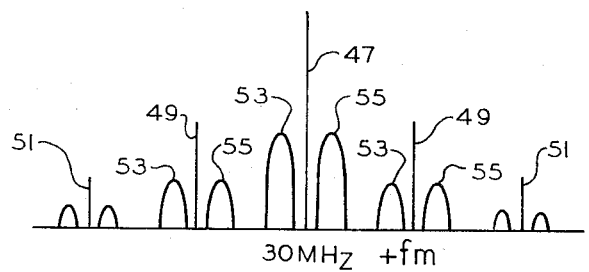
Figure 4C:
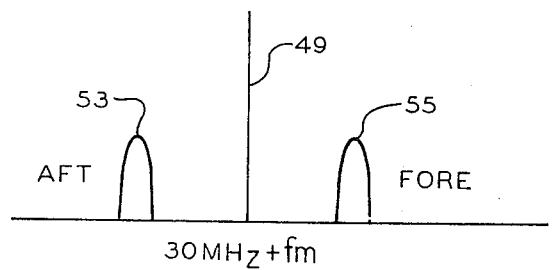

The output of oscillator 25 is also provided to a single sideband modulator 37 which has a second input the same FM signal as used to modulate the RF source. The output of modulator 37 will be a signal at 30 MHz plus the FM. This is provided to a quad network 39 which will have a sine output and a cosine output, each of the outputs being 30 MHz plus FM, but the cosine output being shifted 90° in phase from the sine output. The cosine and sine output of quad network 39 are provided respectively to balanced mixer 33 and balanced mixer 35. At this point, it might be well to look at the nature of the signal at various points in the system. This is illustrated by FIG. 4. In FIG. 4A, the transmitted signal is shown. As with all signals shown herein, the signal is shown in the frequency domain rather than the time domain, i.e. power vs. frequency. For a system with a low modulation index ($\sim$ 1.0) the maximum power shown as line 41 will be at the transmitter frequency of 13.325. The next largest signal will be the first FM sidebands on each side of line 41 shown as lines 43. Further sidebands such as sidebands 45 will appear at multiples of the FM frequency. The received signal will be essentially the same as the transmitted signal except that the frequencies received from the radar back-scatterer will be shifted by the doppler effect in a well-known manner. After processing through the mixer 23 the signal will appear as shown on FIG. 4B. All the frequencies will now appear about the 30 MHz signal shown as line 47. Again sideband lines at multiples of the FM frequency shown as lines 49 and 51 will be present. These lines represent leakage from the transmitter to the receiver antenna and not the actual return signal. The return signals will appear about each of the lines as a pair of doppler return signals 53 and 55. 55 is the fore return signal and 53 the aft return signal. The 30.155 MHz bandpass filter is centered at the first upper FM sideband (nominally 0.155 MHz). Thus, after passing through this filter, the signal will appear as shown on FIG. 4C. That is, there will be a doppler return 53 and a doppler return 55 on each side of the 30 MHz plus FM leakage component 49. This is the signal which is provided into the balanced mixers 33 and 35. When ixed in the mixer 33 mixed the cosine local oscillator, a fore signal which has a relative phase of 90° and an aft signal which has a relative phase of 270° will result. In mixer 35, where the signal is mixed with the sine local oscillator, the phase of both the fore and aft signals will be 0°. Each of the balanced mixer outputs is provided through a leakage elimination filter 61 to eliminate the leakage component 49 shown on FIG. 4C. The output of the leakage elimination filter 61 coupled to mixer 33, is then passed through a 90° phase shifter. This will result in the fore beam having a phase of 180° and the aft beam now having a phase of 0°. The phase of the outputs from mixer 35 remains at 0°. The output of phase shifter 63 and the output of the leakage elimination filter 62 are provided to a summing amplifier 65 and a difference amplifier 67. When the two signals are summed, the fore signals which is 180° out of phase will cancel out the fore signal which is at 0° and only the aft signal will remain. When the two signals are differenced, the two aft signals in phase will cancel and the two fore signals will be added resulting in only the fore signal. In this way, the two signals have effectively been separated.

The outputs of the amplifiers 65 and 67 are provided as two inputs to a switch 69 which has its output provided to the frequency tracker 71. Although shown as a conventional single pole, double throw switch, switch 69 will preferably be a solid state switch such as and FET switch. The frequency tracker 71 may be constructed along the lines of the above referenced patents. The integrator 73 which is part of the frequency tracker and local oscillator 75 is shown separately on FIG. 3. These are arranged so that a single integrator 73 with a plurality of capacitors 77A through D, each swtiched in and out by a swtich 79A through D may be used to further reduce hardware. With this arrangement, the capacitor which is switched into the feedback path of the integrator-amplifier 73 will be the one which controls the frequency output of oscillator 75. Such time sharing of the oscillator is disclosed in U.S. application Ser. No. 159,861, filed by E. F. Darboven et al. on July 6, 1971, now U.S. Pat. No. 3,710,386, and assigned to the same assignee as the present invention. The primary difference between the system disclosed therein and this portion of the present invention is that the Darboven system is for use with a doppler system wherein only one beam at a time is transmitted. Timer 15 will provide the timing signals on the lines 81, 83, 85, and 87. The sequence is illustrated in FIG. 2. When the right forward output, 81, is ON, the switch 79A in the frequency tracker is closed and switch 69 is coupled to the difference amplifier 67. The output of amplifier 67 is thus sampled for one full cycle of 18 Hz. The input to the frequency tracker is beam 1F (see FIG. 1), for one-half of the full cycle, and then beam 2F for the other half of the cycle. As described in the above referenced applications, the frequency tracker requires both of these beams and must find the intersection of the two slightly displaced beams to provide the proper tracker output. For the second half of the right-hand cycle, i.e., beams 1 and 2, the output on line 83 will cause switch 79B to switch in capacitor 77 and at the same time will switch switch 79 to the summing amplifier 65 to permit the frequency tracker to track the two aft beams 1 and 2. Similarly, when the beam switches over to the other side, i.e., beams 3 and 4, the capacitor 77C will first be swtiched in by an output on line 85 and then the capacitor 77D switched in by an output on line 87. At the same time, the proper switching before fore and aft will be accomplished at switch 69. The four outputs developed in sequence with the capacitors 77A through C in the circuit may then be used in the manner described in the above referenced Darboven patent using the computer in U.S. Pat. No. 2,981,944 to Washburne referenced therein.

Thus, by providing circuits which allow the separation of the fore and aft beam signals in a beam-lobed doppler system and by utilizing a time-shared integrator and oscillator, a significant reduction in the required hardware has been achieved. Although a specific embodiment of the invention has been shown and described, it will be obvious to those skilled in the art that various modifications may be made without departing from the spirit of the invention which is intended to be limited solely by the appended claims.

What is claimed is:

1. In a Doppler navigation system comprising at least a microwave transmitter, and a signal to frequency modulate the transmitter, a transmitting antenna coupled to the transmitter to simultaneously transmit at least a pair of fore and aft beams, a receiving antenna to receive the reflected beam signals containing respective fore and aft doppler return signals, and a receiver front end including means having the received signal as an input to provide from the received beam signal a signal at a lower intermediate frequency, means to separate the first and second doppler return signals obtained comprising:

a. an oscillator operating at the intermediate frequency;

b. a single sideband modulator having the output of said oscillator and the frequency modulating signal as input and providing a single sideband output;

c. a quad network having the output of said modulator as an input and providing first and second outputs at said frequency but shifted in phase 90° from each other;

d. a first mixer having the output of the receiver front end and said first quad output as inputs;

e. means to shift the output of said first mixer 90°;

f. a second mixer having the output of the receiver front end and said second quad outputs as inputs;

g. a summing amplifier having as inputs the outputs of said second mixer and said phase shifter; and h. a difference amplifier having as inputs the outputs of said second mixer and said phase shifter whereby the output of said summing amplifier will be the fore doppler return signal and the output of said difference amplifier the aft doppler return signal.

2. The invention according to claim 1 and further including first and second leakage elimination filters interposed respectively between said first mixer and said phase shifter and said second mixer and said summing and difference amplifiers.

3. The invention according to claim 1 and further including:

A. a frequency tracker;

B. means to alternately couple the outputs of said summing and difference amplifiers to said frequency tracker.

4. The invention according to claim 3 where in said frequency tracker includes a single oscillator controlled by an integrator output with the integrator having a plurality of switched capacitors in its feedback path, one being provided for each beam and further including means to switch into the feedback path a capacitor corresponding to the beam whose return signal is being switched to said frequency tracker.

5. The invention according to claim 4 wherein the transmitter transmits a fore and aft lobed beam on one side and then a fore and aft lobed beam on the other side, right and left switching occurring at a first rate and beam lobing at a rate which is an even multiple thereof and said means to couple, couples the output of said summing amplifier for at least one lobing cycle and the output of said difference amplifier for at least one lobing cycle for each of the right and left cycles.

6. In a Doppler navigation system comprising at least a microwave transmitter, and a signal to frequency modulate the transmitter, a transmitting antenna coupled to the transmitter to simultaneously transmit at least a pair of fore and aft beams, a receiving antenna to receive the reflected beam signals containing respective fore and aft doppler return signals, and a receiver front end including means to provide from the received beam signal a signal at a lower intermediate frequency, a method of separating the simultaneously received fore and aft doppler return signals comprising:

A. developing, from the intermediate frequency, two signals, one in phase with said frequency and one 90° out of phase with said frequency;

B. mixing the signal obtained from the received beam signal respectively with said in phase and said out of phase signal to develop first and second outputs;

C. adding said first and second outputs to obtain the fore return signal; and

D. differencing said first and second outputs to obtain the aft return signal.

7. The invention according to claim 6 and further including alternately providing said fore and said aft return signals to a frequency tracker.

8. The invention according to claim 7 wherein said frequency tracker includes a single oscillator controlled by an integrator output with the integrator having a plurality of switched capacitors in its feedback path, one being provided for each beam and further including coupling the capacitor associated with the one of the fore and aft signals being input into said feedback path.

9. The invention according to claim 8 wherein the transmitter transmits a fore and aft lobed beam on one side and then a fore and aft lobed beam on the other side, right and left switching occurring at a first rate and beam lobing at a rate which is an even multiple thereof and said fore return signal is coupled for at least one lobing cycle and said aft return signal for at least one lobing cycle for each of the right and left cycles.

* * * * *